(No Model.)
J. BERMEL.
AXLE NUT.
No. 500,464. Patented June 27, 1893.
Fig. 1.
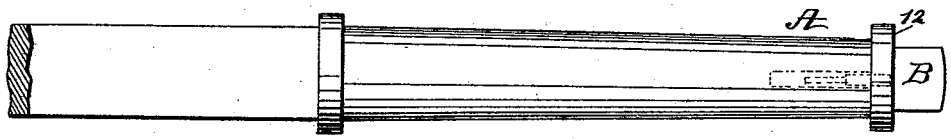
Fig. 2. Fig. 3. Fig. 4.
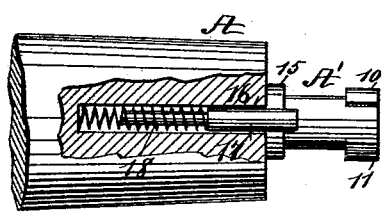  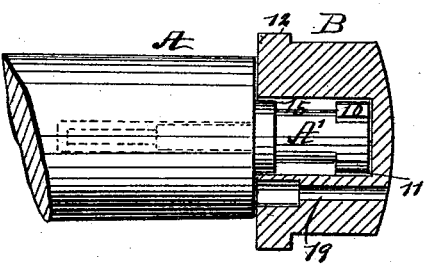
Fig. 5. Fig. 6. Fig. 7.
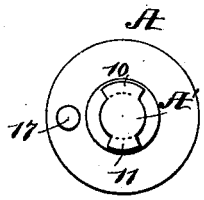 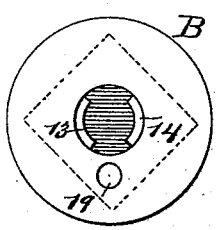 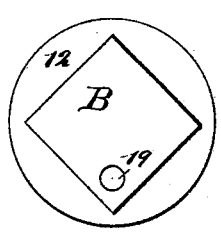
Fig. 8.
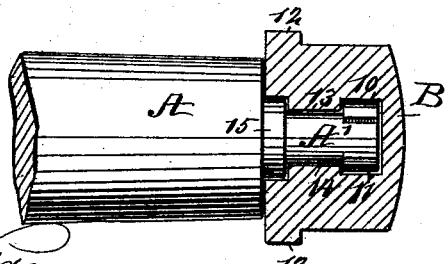
WITNESSES:
Chas. Nida.
C. Sedgwick.
INVENTOR
J. Bermel
BY Munn & Co.
ATTORNEYS.

UNITED STATES PATENT OFFICE.

JOSEPH BERMEL, OF MIDDLE VILLAGE, NEW YORK.

AXLE-NUT.

SPECIFICATION forming part of Letters Patent No. 500,464, dated June 27, 1893.

Application filed November 28, 1892. Serial No. 453,376. (No model.)

*To all whom it may concern:*

Be it known that I, JOSEPH BERMEL, of Middle Village, in the county of Queens and State of New York, have invented a new and useful Improvement in Axle-Nuts, of which the following is a full, clear, and exact description.

My invention relates to an improvement in axle nuts and especially to an improvement upon the construction of axle nuts shown and described in the patent granted to myself November 8, 1892, No. 486,023; and the object of the invention is to provide an axle nut which may be expeditiously and conveniently locked upon the axle without the locking mechanism being visible; and a further object of the invention is to so construct the interlocking portions of the axle and the nut that the two may be expeditiously and conveniently engaged and disengaged, and wherein when the two parts are brought into locking engagement they will not separate unless one is purposely disengaged from the other.

The invention consists in the novel construction and combination of the several parts, as will be hereinafter fully set forth and pointed out in the claim.

Reference is to be had to the accompanying drawings forming a part of this specification, in which similar figures and letters of reference indicate corresponding parts in all the views.

Figure 1 is a side elevation of a portion of an axle with the axle nut applied thereto. Fig. 2 is a partial side elevation of the end of an axle adapted to receive the improved axle nut, a portion of the axle being broken away. Fig. 3 is a central vertical section through the axle nut. Fig. 4 is a sectional view illustrating the nut as applied to the axle, but not locked thereon. Fig. 5 is an end view of that portion of the axle shown in Fig. 2. Fig. 6 is an inner face view of the nut shown in Fig. 3. Fig. 7 is an outer face view of the nut; and Fig. 8 is a sectional view illustrating the axle and nut in locking engagement.

The reduced end A' of the axle A, upon which the nut B, is to be fitted, is provided at top and bottom with diagonally opposed lugs 10 and 11, the lugs being formed at the extreme outer end of the said reduced section. The lugs are semi-circular in cross section, and their side edges are under-cut, whereby the lugs are also somewhat dove-tail shape in cross section. Both of the lugs may be made of the same size, but if in practice it is found desirable one may be made smaller than the other.

The nut B, may be of any exterior contour that fancy may dictate or that in practice may be found most desirable. Usually, however, the nut is given an exterior polygonal or rectangular appearance; but the inner chamber of the nut is circular, and the inner end face of the nut is provided with a flange 12.

Within the chamber of the nut two lugs 13 and 14, are diametrically produced. These lugs are located some little distance back of the inner face of the nut, as shown in Figs. 3, 6 and 8, and the lugs instead of being arranged at top and bottom of the nut are arranged one at each side, and the spaces between the lugs of the nut at top and bottom are of such width and shape as to neatly receive the lugs 10 and 11 of the axle.

The lugs in the nut are set back a sufficient distance only to receive the collar 15, located upon the axle at the base of its reduced portion. The axle is further provided at one side of the collar with an opening 16, the opening extending longitudinally of the axle, and into this opening a bolt 17, is introduced, controlled by a spring 18, ordinarily surrounding the bolt and also located in the opening 16. Normally a portion of the bolt extends beyond the outer face of the larger end portion of the axle, as shown best in Fig. 2; and the nut B, has produced in its inner face at one side of its central opening an aperture 19. This aperture extends through from the inner to the outer face of the nut, and is preferably made in two diameters, being largest at its inner end; and this larger section of the aperture 19, is adapted to receive the bolt 17 of the axle, and the aperture is carried through the nut in order that a round nail, or any like object may be pushed into the aperture of the nut against the spring bolt 17, to force that bolt entirely within the opening 16 in which the bolt has movement.

The aperture 19 in the nut is so located, and likewise the bolt 17 in the axle, that one will not enter the other until the lugs of the axle have been brought in locking engagement with the lugs in the nut, and the operation of placing the nut upon the axle is as follows: The nut is made to approach the axle in such manner that the lugs of the axle will be received within the spaces between the lugs of the nut, as shown in Fig. 4, and the nut is then forced inward upon the reduced end of the axle until the lugs of the axle have been passed beyond the lugs in the nut, and the lugs in the nut engage practically with the collar upon the axle. The bolt 17 will at this time be pressed inward by the inner surface of the nut, and the nut is then given about one-quarter of a turn, or sufficient to bring the lugs upon the axle to a full bearing against the outer end surfaces of the lugs in the nuts as shown in Fig. 8, and at this time the aperture in the nut will be immediately opposite the bolt in the axle, and the latter will enter the aperture in the nut and prevent the nut from being turned until the bolt is forced out from the nut.

It will thus be observed that an axle nut constructed as above set forth is not only simple, durable and readily applied, but when applied it will remain securely in place until purposely removed, and furthermore the locking mechanism of the nut is entirely concealed.

If in practice it is found desirable two locking bolts may be employed, and when such is the case the bolts are preferably placed nearly opposite each other.

Having thus described my invention, I claim as new and desire to secure by Letters Patent—

The combination, with an axle having a reduced end, lugs located diametrically opposite upon the reduced portion of the axle, and a spring-controlled bolt having movement in the axle at one side of its reduced portion, of a nut adapted to receive the reduced end of the axle and provided also with diametrically opposed lugs but interiorly located, the lugs in the nut being placed near the central portion of the chamber of the nut, and the space between the lugs of the nut being practically equivalent to the circumferential length of the lugs of the axle, the lugs of the axle being adapted to pass back of the lugs in the nut, the said nut having also produced therein an aperture extending through from face to face, the aperture being made in two diameters, the inner or larger section being adapted to receive the spring-controlled bolt of the axle and the smaller portion of the aperture being adapted to receive a releasing device, as and for the purpose set forth.

JOSEPH BERMEL.

Witnesses:
   HENRY WALTER, Jr.,
   GEORGE MAGER.